United States Patent [19]
McVey

[11] Patent Number: 4,791,702
[45] Date of Patent: Dec. 20, 1988

[54] CARRYING HANDLE

[75] Inventor: Harry D. McVey, Pendleton, Ind.

[73] Assignee: General Motors Corporation, Detroit, Mich.

[21] Appl. No.: 161,956

[22] Filed: Feb. 29, 1988

[51] Int. Cl.⁴ .................................. H01M 2/10
[52] U.S. Cl. .................. 16/114 B; 16/125; 16/DIG. 15; 429/187
[58] Field of Search ......... 16/110.5, 111 R, 114 B, 16/114 R, 115, 116 R, 122, 124, 125, 126, DIG. 12, DIG. 15, DIG. 24, DIG 28; 190/115, 116, 117; 294/137, 149, 153, 154, 157, 903; 429/187

[56] References Cited

U.S. PATENT DOCUMENTS

| | | |
|---|---|---|
| 161,757 | 4/1875 | Covert . |
| 216,143 | 6/1879 | Brooks et al. . |
| 466,656 | 1/1892 | Covert . |
| 587,526 | 8/1897 | Holden . |
| 655,155 | 7/1900 | Littlepage . |
| 971,876 | 10/1910 | Apple ........................ 16/125 |
| 2,339,671 | 1/1944 | Bergman ...................... 24/123 |
| 3,243,020 | 3/1966 | Friedlander .................. 16/125 |
| 4,124,922 | 11/1978 | Speedie ........................ 24/115 |
| 4,143,446 | 3/1979 | Down ........................... 24/132 |
| 4,374,188 | 2/1983 | Campbell et al. ........... 16/DIG. 15 |

Primary Examiner—Nicholas P. Godici
Assistant Examiner—William Scott Andes
Attorney, Agent, or Firm—Lawrence B. Plant

[57] ABSTRACT

A rope-type carrying handle including a discontinuous segment of rope having two unconnected free ends and a handgrip therefor which securely anchors the ends and center of the rope against longitudinal movement in the handle. The handgrip comprises first and second members which mate so as to trap the rope therebetween and include a plurality of receptacles, retainer pins and ribs which cooperate to variously so penetrate, spread, wedge and pinch the rope within the handgrip as to prevent relative movement therebetween.

7 Claims, 1 Drawing Sheet

CARRYING HANDLE

This invention relates to a rope-type handle suitable for carrying SLI electric storage batteries and more particularly to a handgrip therefor.

BACKGROUND OF THE INVENTION

Rope-type handles are well known for carrying a variety of articles including electric storage batteries. A common rope-type handle includes a continuous (i.e., endless) length of rope having a segment of flexible tubing around the center thereof to provide a handgrip and two loops extending from opposite ends of the handgrip to engage the article to be carried. The handles are typically formed by joining (e.g., bonding, stapling, tying, etc.) the otherwise free ends of a piece of rope together to prevent their separation when lifting forces are applied to the rope, and the handgrip is positioned so as to cover the joint between the rope ends. Such tube-type handgrips are not ecstatically appealing and tend to bend under the weight of heavy articles (e.g., a Pb-acid battery) thereby causing discomfort to the carrier. Other rope-type handles have been made by the insert-molding process wherein the center and free-ends of the rope are inserted in a mold and plastic injected thereabout to form a rigid handgrip which embeds the free-ends of the rope to prevent extraction thereof from the handgrip. This technique is costly, time consuming, and requires specialized equipment.

It is an object of the present invention to provide a rope-type carrying handle in which a discontinuous length of rope is assembled with a handgrip by a simple cost-effective technique that insures retention of the free-ends by the handgrip but without having to insert molding the handgrip thereabout. This and other objects and advantages of the present invention will be more readily apparent from the description thereof which follows.

BRIEF DESCRIPTION OF THE INVENTION

Essentially the present invention comprehends a carrying handle including a discontinuous rope (i.e., having two unconnected free ends) and a handgrip therefor which securely anchors the rope's free ends and centermost portion together so as to provide rope loops extending from either end of the handgrip (i.e., for engaging articles to be carried) and to prevent: (1) relative movement of the rope with respect to the handgrip; and (2) extraction of the rope's free ends from the handgrip when carrying forces are exerted on the loops. The handgrip includes first and second members which are secured (e.g., ultrasonically welded) together along their peripheries and immovably trap the rope therebetween. More specifically, the first member includes a plurality of receptacles each having a pair of opposing walls defining a slot therebetween for receiving and retaining the rope which extends longitudinally therethrough. The slot narrows from top-to-bottom such that the rope is compressed more and more as it is pushed deeper and deeper into the slot. Each of the walls includes a pocket which is intermediate the ends of the slot and directly opposite the pocket in the opposing wall. The second member includes a plurality of tapering (preferably conically tipped) retainer pins which project into the slot between the opposing pockets so as to penetrate, spread and wedge the rope in the slot tightly into the pockets on either side of the pin. In addition, the second member includes a pair of ribs on opposite sides of each of the pins and extending transverse the longitudinal direction of the slot. When the second portion is joined to the first portion, the ribs press down on the rope extending from the ends of the slot and pinch it between the ribs and the bottom of the slot. This combined compression, wedging and pinching of the rope firmly anchors the rope against longitudinal movement in the receptacles. Most preferably, each of the free ends of the rope will be engaged by at least two of the receptacles such that the free end passes through one of the receptacles in a first direction and forms a loop within the handgrip before passing through the second receptacle in an opposite direction. The center portion of the rope is preferably engaged by at least one of the receptacles to prevent longitudinal sliding of any portion of the rope with respect to the handgrip.

DETAILED DESCRIPTION OF A PREFERRED EMBODIMENT

This invention will better be understood when considered in the light of the following detailed description of a specific preferred embodiment thereof which is given hereafter in conjunction with the several drawings in which.

Figure 5:
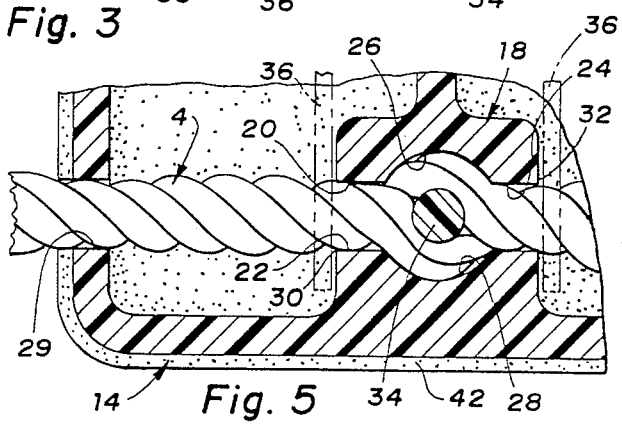
FIG. 5 is an enlarged view of the lower left-hand corner of FIG. 2.

The several Figures show a carrying handle 2 including a discontinuous segment of braided nylon rope 4 having a central portion 6 midway between two unconnected end portions 8 and 8'. A handgrip 10 comprising upper and lower members 12 and 14, respectively, secures both the central portion 6 and ends 8, 8', of the rope 4 against longitudinal movement with respect thereto. The rope 4 extends beyond the ends E of the handgrip 10 to provide loops 16 for engaging the article (e.g., electric storage battery) 20 to be carried. The lower member 14 includes a plurality of receptacles 18 (best shown in FIG. 5) each of which includes a pair of opposing walls 20 and 22, defining a slot 24 for receiving the rope 4. The slot 24 is somewhat narrower (especially at the bottom) than the diameter of the rope 4 so that the rope 4 is compressed into the slot 24 during assembly. Similarly, openings 29 in the ends E of the handgrip are narrower than the diameter of the rope for compression of the rope therein. The walls 20 and 22 each include oppositely facing pockets 26 and 28, respectively, located in the approximate center of the receptacle 18 between the ends 30 and 32 of the slot 24, the purpose of which is described hereinafter.

The upper member 12 includes a plurality of depending tapered (i.e., preferably conical) retainer pins 34 which register with the center of the opening between the opposing pockets 26 and 28 in the lower member 14 when the two members 12 and 14 are joined together. Ribs 36 depend from the upper member 12 on either side of the pins 34 and extend laterally in a direction generally transverse the longitudinal direction of the slot 24 and rope 4 therein.

Figure 1:
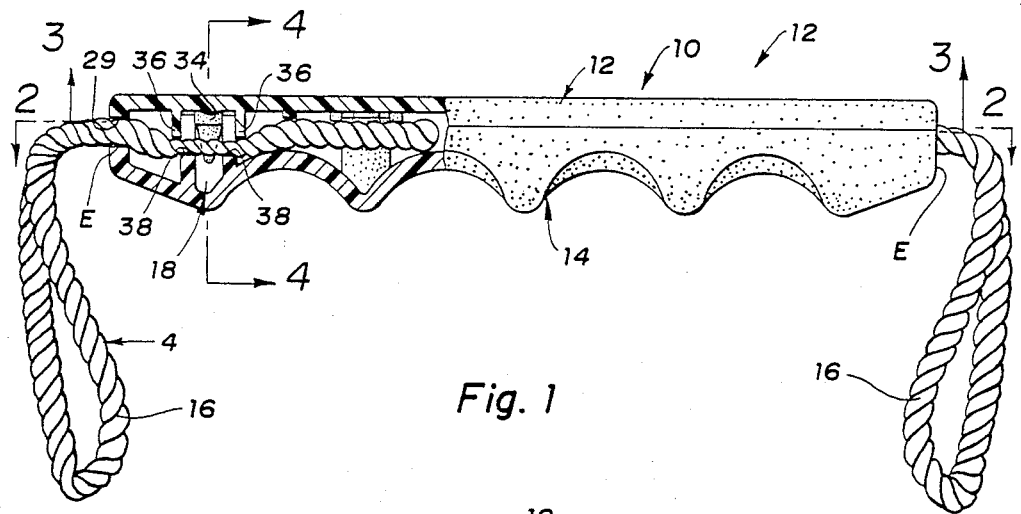
FIG. 1 is a partially sectioned elevational view of a handle in accordance with the present invention.
Figure 2:
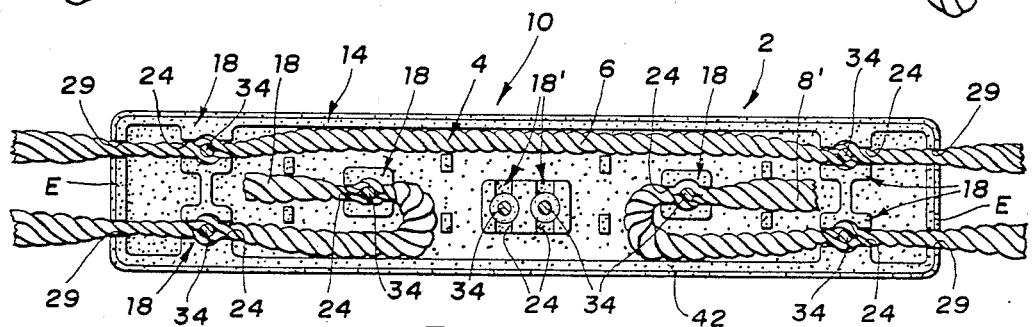
FIG. 2 is a top view of the handle's handgrip taken in the direction 2—2 of FIG. 1.
Figure 3:
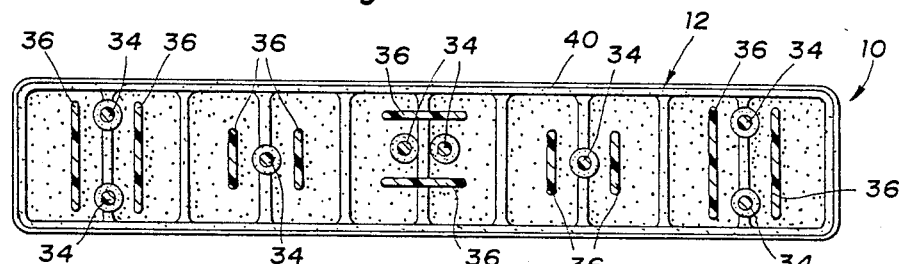
FIG. 3 is a bottom view of the handle's handgrip taken in the direction 3—3 of FIG. 1.
Figure 4:
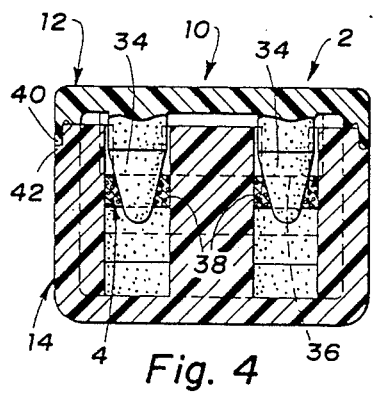
FIG. 4 is a sectioned elevational view of the handle's handgrip taken in the direction 4—4 of FIG. 1.

During assembly, the rope 4 is laced through as many receptacles 18 as needed for the weight being carried. For example and as best shown in FIG. 2, the center portion 6 is engaged by two receptacles and each of the rope ends by two receptacles when the handle is being used to carry an electric storage battery weighing about 50 lbs. If desired, the ends 8, 8' of the rope 4 may additionally be laced through the unused receptacle 18' in the center of the handgrip (see FIG. 2). After the rope is in place, the top member 12 is pressed down onto the lower member 14 such that the pins 34 penetrate, spread and wedge the rope tightly into the pockets 26 and 28. At the same time, the depending ribs 36 compress the rope 4 at the ends 30, 32 of the slot 24 and thereat pinch the rope between the ribs 36 and the bottom 38 of the slot 24, as best shown in FIGS. 1 and 4. Thereafter, the top member 12 and bottom member 14 are bonded (e.g., ultrasonically, thermally, adhesively, etc.) together along their respective peripheries 40 and 42, respectively. Other methods for bonding the two together are acceptable including solvent and/or heat sealing.

While the invention has been described primarily in terms of a specific embodiment thereof it is not intended to be limited thereto but rather only to the extent set forth hereafter in the claims which follow.

The embodiments of the invention in which an exclusive property or privilege is claimed are defined as follows:

1. A carrying handle including (1) a discontinuous rope having a central portion and two unconnected end portions positioned proximate one another and said central portion so as to provide a pair of loops for engaging an article to be carried, and (2) a handgrip tightly engaging said central portion and said ends between said loops so as to retain said rope against relative movement with respect to said handgrip and to prevent extraction of said ends therefrom incident to carrying forces exerted on said loops, said handgrip comprising first and second members mating one to the other so as to engage and retain said rope substantially immovably therebetween:

said first member comprising a plurality of receptacles each having a pair of opposing walls defining a slot therebetween for receiving and retaining said rope extending longitudinally therethrough, said walls each including a pocket intermediate the ends of said slot and opposite a like pocket in the opposing wall; and said second member comprising, (a) a plurality of tapering retainer pins each projecting into a said slot between said opposing pockets so as to penetrate, spread and wedge said rope tightly into said pockets on either side of said pin, and (b) a pair of opposing ribs on opposite sides of each said pin extending substantially transverse the longitudinal direction of said slot and pressing on said rope at said slot ends so as to pinch said rope between said ribs and the bottom of said slot.

2. The handle according to claim 1 wherein the width of said slot is narrower than the diameter of said rope and said rope is compressed in said slot.

3. The handle according to claim 1 wherein each said unconnected end of said rope is engaged by at least two of said receptacles.

4. The handle according to claim 3 wherein each said unconnected end passes through one of said receptacles in a first direction and forms a loop within said handle before passing through a second of said receptacles in a direction substantially opposite to said first direction.

5. The handle according to claim 4 wherein the perimeters of said first and second members are bonded together.

6. The handle according to claim 1 wherein said tapering pin has a conical tip.

7. The handle according to claim 1 wherein said central portion of said rope is engaged by at least one of said receptacles.

* * * * *